United States Patent [19]

Kurtz

[11] 4,079,624
[45] Mar. 21, 1978

[54] LOAD WASHER TRANSDUCER ASSEMBLY

[75] Inventor: Anthony D. Kurtz, Englewood, N.J.

[73] Assignee: Kulite Semiconductor Products, Inc., Ridgefield, N.J.

[21] Appl. No.: 755,343

[22] Filed: Dec. 29, 1976

[51] Int. Cl.² ............................................. G01L 5/00
[52] U.S. Cl. ................................. 73/141 A; 73/88 F
[58] Field of Search ............... 73/141 A, 88 F; 338/3, 338/5, 6; 177/211

[56] References Cited

U.S. PATENT DOCUMENTS

| 2,998,585 | 8/1961 | Bodner et al. | 73/88 F |
| 3,116,469 | 12/1963 | Wu | 338/3 |
| 3,422,445 | 1/1969 | Jacobson | 73/141 A |

FOREIGN PATENT DOCUMENTS

| 1,158,284 | 11/1963 | Germany | 73/141 A |
| 222,280 | 7/1942 | Switzerland | 73/88 F |
| 986,973 | 3/1965 | United Kingdom | 177/211 |

*Primary Examiner*—Anthony V. Ciarlante
*Attorney, Agent, or Firm*—Arthur L. Plevy

[57] ABSTRACT

A load washer transducer assembly includes a cylindrical housing symmetrically disposed about a given axis and having a longitudinal central aperture extending from a top to a bottom surface. The loop and bottom surfaces each have a peripheral flange coaxially located with respect to the aperture. The major surface of said cylinder includes a narrow slot located relatively centrally and coaxial with the aperture. A thin metallic shim is coupled to the housing and positioned across the slot and has mounted thereon a sensor element to monitor a pressure applied to one of said surfaces as concentrated mainly about said associated flange. In a typical load cell, another thin metallic shim is coupled to the housing and positioned across the slot and along the same diameter as the above noted shim. This shim also has mounted thereon a sensor element. The two sensors mounted diametrically opposite on the housing and across the slot serve to provide compensation for bending moments which may be induced by off-center loads. Other embodiments which employ more than two shims and associated sensors are also disclosed.

20 Claims, 7 Drawing Figures

LOAD WASHER TRANSDUCER ASSEMBLY

BACKGROUND OF INVENTION

This invention relates to an improved load cell of the type used to measure tension or compression loads and more particularly relates to a washer type load cell adapted to be used with gap-spanning sensor elements.

Load cells have many applications and are used in the prior art in electronic weighing systems for monitoring force and pressure and so on. As such, these cells employ a suitable sensor element such as piezoelectric, reluctance, capacitive or piezoresistive element which is positioned in a housing to monitor the force or pressure exerted on the housing when the load cell is positioned in a suitable environment.

The most popular types of load cells employ a strain gage element which may be an unbonded or bonded wire gage or a foil or a bonded semiconductor element. These gages provide higher sensitivity while further eliminating mechanical linkages and moving parts. They also enable one to achieve good temperature specifications and serve to reproduce load deflection in the elastic member or housing with good linearity.

A major concern in the design of the load cell resides in the housing arrangement. In this manner, the housing serves to couple or transmit the force or pressure to be monitored by the cell to the sensor associated with the cell. The housing would therefore be capable of transmitting such forces to the sensor in a linear manner without providing undue distortions and improper bending movements when the monitored load is not properly aligned with the axis of the load cell. Some load cells are required to have high overall stiffness. Thus, the load cell housing should provide a high overall stiffness while still allowing sufficient strain to be monitored by the associated sensor element.

It is therefore an object of the present invention to provide a load cell transducer capable of accurately monitoring an external force employing a housing which is simple and relatively inexpensive to fabricate; and which provides a relatively stiff structure, but also allows for adequate strain levels to be transmitted to the sensor element or elements.

BRIEF DESCRIPTION OF PREFERRED EMBODIMENT

A load cell transducer comprises a longitudinal cylindrical member disposed about a given axis and having a top and a bottom surface, each including a central aperture extending along said axis between said surfaces, at least one of said top or bottom surfaces having a peripheral flange in coaxial alignment with said central aperture, the main surface of said member between said top and bottom surfaces having a peripheral slot located about said axis and relatively coaxial with said aperture, and at least one sensor secured to said main surface of said housing and positioned to bridge said slot to provide an output proportional to the magnitude of a load applied to said surface containing said flange.

DETAILED DESCRIPTION OF THE FIGURES

Figure 1:
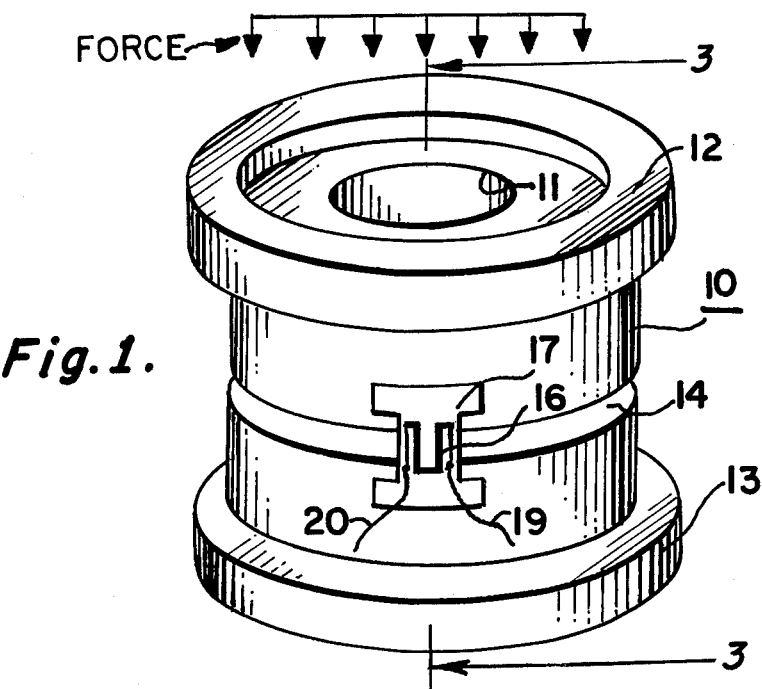
FIG. 1 is a perspective view of a load washer transducer according to this invention.

Referring to FIG. 1, there is shown a load cell 10. Basically, the cell 10 is of a washer-like configuration and has the appearance of a spool. While the drawings are not to scale, the cell may be wider than it is long. For example, the cell 10 may have an overall diameter of 0.750 inches with a height of approximately 0.50 inches. The cell 10 is of a cylindrical configuration and has a central aperture 11 which is located relatively symmetrical about the main axis of the cylinder.

The top and bottom ends of the cylinder or load cell 10 have a peripheral flange as 12 and 13. Thus, as seen from the Figure, the central aperture 11 is enclosed by the top and bottom flanges 12 and 13. A peripheral slot 14 is formed centrally about the periphery of the cylinder but does not communicate with the central aperture. The slot 14 is relatively narrow and for example, may be approximately 0.015 inches wide for a cylinder of 0.50 inches in height.

Figure 2:
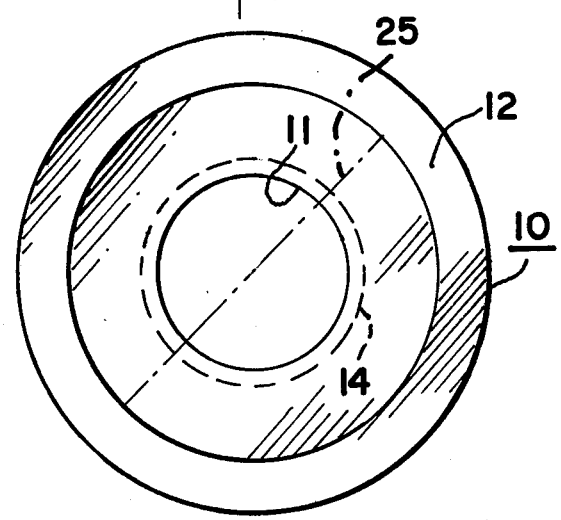
FIG. 2 is a top view of the load cell washer transducer of FIG. 1.

FIG. 2 shows a top view of the housing 10 indicating the relative dimensions of the flange 12 and the central aperture 11.

Figure 3:
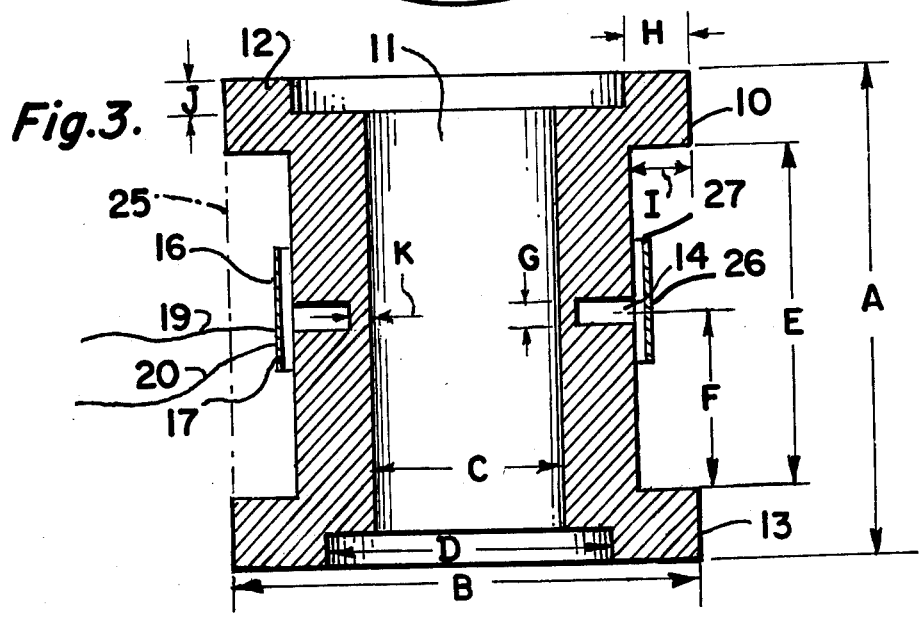
FIG. 3 is a cross-sectional view taken through line 3—3 of FIG. 1.

As can be seen from FIG. 3 which is a cross-sectional view, the peripheral slot 14 is relatively deep as compared to the diameter of the central portion of the cylinder 10. In order to gain a clear understanding of typical dimensions reference is given to the tabulations below with the dimensions of FIG. 3 depicted by the appropriate letters. It is understood that the dimensions given in the Table are representative of one type of load cell and other dimensions using the same general relationships can be employed to provide different sized cells for various applications.

TABLE

| LETTER | DESIGNATION | INCHES |
|---|---|---|
| A | height of cylinder | .50 |
| B | diameter of outer portion | .750 |
| C | diameter of aperture 11 | .346 |
| D | diameter of inner circle | .550 |
| E | length of central portion of cylinder 10 | .300 |
| F | distance of slot 14 from end of flange | .150 |
| G | width of slot 14 | .015 |
| H | width of flange 12 & 13 | .10 |
| I | width of bottom of flange | .10 |
| J | height of flange | .020 |
| K | distance between end of slot 14 & aperture 11 | .011 |

It is noted that the above dimensions are typical and do not indicate typical mechanical tolerances.

The cylinder member 10 is typically fabricated from a metallic material such as a steel alloy, kovar and so on and is machined accordingly. The machined member may be heat treated prior to the formation of the peripheral slot 14.

The unit thus described has the following advantages: It is an integral structure which is fabricated from a unitary metallic piece and hence, is relatively uniform in material characteristics. The unit is a relatively stiff member due to the inclusion of material between the slot 14 and the aperture 11. The slot 14 is relatively narrow to allow a high figure of merit in operation of the load cell. The strain in a sensor is given by $\Delta l$ divided by $l$, where $\Delta l$ is the deflection of the sensor and $l$ is its effective length. Thus, for a given deflection and a narrow slot, a shorter effective length of a sensor will result in a higher figure of merit. This aspect of the relationship of the slot width to the length of the sensor has been described in a copending application entitled TRANSDUCERS EMPLOYING GAP-BRIDGING SHIM MEMBERS filed on Oct. 22, 1975 as Ser. No. 624,605 for Anthony D. Kurtz and assigned to Kulite Semiconductor Products, Inc., the Assignee herein.

Thus shown in FIG. 1 is a sensor 16 of a length almost equal to the width of the slot 14. The sensor which may be a piezoresistive device is bonded to a metal shim 17 of an "I" shaped configuration. The shim 17 may be formed by an etching process and is fabricated from a relatively thin metallic material which may have a higher thermal expansion coeffecient than the material which constitutes the cylinder 10. The shim 17 is welded or epoxied across the slot at elevated temperatures and the piezoresistive element 16 is affixed to the shim by means of a glass or epoxy bond. The shim 17 acts as a spring member to restore the slot to its quiescent condition after the application of a pressure or force to the load cell 10.

The sensor 16 as shown, is of a general "U" shaped configuration and basically in this particular case, is mounted on the shim 17 parallel to the main axis of the load cell 10. A sensor or gage 16 in this orientation, responds to strain or stress in the longitudinal direction or along the major axis of the cylindrical load cell 10.

Shown in FIG. 3 is a metallic shim 27 having positioned thereon another sensor 26. The shim 27 is mounted opposite shim 17 and the sensor 26 is located across the slot 14. The orientation of the sensor 26 is as the orientation of sensor 16. In this manner, the shims 17 and 27 are placed at an opposite end of a diameter as 25 for example, of FIG. 2. In a load cell, the two sensors which are thus mounted diametrically opposite provide compensation for bending moments induced by off-center loads.

For example, for a typical force applied, one shim such as 17 and therefore sensor 16 will be in tension and the other such as sensor 26, will be in compression. This is so as the slotted load cell will tend to bend about slot 14 for the application of force thereto.

Figure 5:
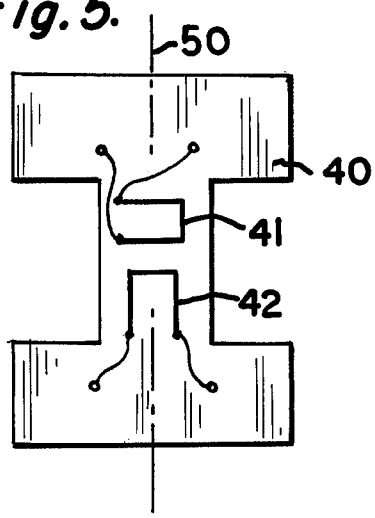
FIG. 5 is a top plan view of a shim member having two sensors mounted thereon.

In order to provide full compensation and to further eliminate or reduce bending moment errors, each shim may contain two sensors in a configuration similar to that shown in FIG. 5. Thus, in FIG. 5, one sensor 41 is positioned relatively perpendicular to the shim axis 50, while the other sensor 42 is positioned relatively parallel to the shim axis 50. It is, of course, understood that the shim as mounted would have its axis parallel to the major axis of the cylindrical load cell housing 10. In this manner, the sensor as 42 which is parallel to the axis, is responsive to a maximum stress applied across the slot, while the gage or sensor 41 responds to a transverse strain which typically is in a negative direction and is approximately one-third the magnitude of the parallel stress applied to gage 42. The ratio of strain or stress in the transverse direction to the strain or stress in a longitudinal or parallel direction is referred to as Poisson's ratio and hence, those experienced in the strain gage art will sometimes refer to an arrangement as dipicted in FIG. 5 as a Poisson half-bridge.

Thus, if one desired, one could employ two shims as 17 and 27 at opposite ends of a diameter wherein each shim would have mounted thereon, two gages arranged as shown in FIG. 5. These gages could then be wired by access to the appropriate terminals in a Wheatstone bridge configuration, wherein two arms of the bridge would be responsive to longitudinal stress, while the other two arms would be responsive to transverse stress. Thus, any off-set in bending moment would be compensated for by the bridge configuration.

As shown in FIG. 3, the spacing between the flange and the shims as 17 and 27 may be filled in with a potted material 25 (RTV) or a similar compound. The potting material 25 would be deposited after welding the shim and suitable leads as 19 and 20 for example, would be directed from the sensor elements as 16 and 26.

A major advantage of the above described load cell are the peripheral flanges 12 and 13 which enable the optimum application of a force to be applied directly to the slot 14, thus enabling the bridging shims and associated sensors to accurately respond.

A force or pressure imposed on the surface of the load cell of FIG. 1 as for example, will be concentrated mainly on the flange 12 or 13 since the flanges extend above the main surface of the cell.

For example, a platform may be positioned above the load cell and the platform would bear down and exert a force on the flange. The flange as 12 or 13 (depending upon the direction of the force) serves to determine that the force will be concentrated mainly at the peripheral edges and hence, provide optimum movement near the peripheral edge of the slot 14 or near the location of the bridging shim and sensor.

This assures accurate and reliable strain transfer to the element mounted on the shim to enable uniform and accurate readings and results.

Figure 4:
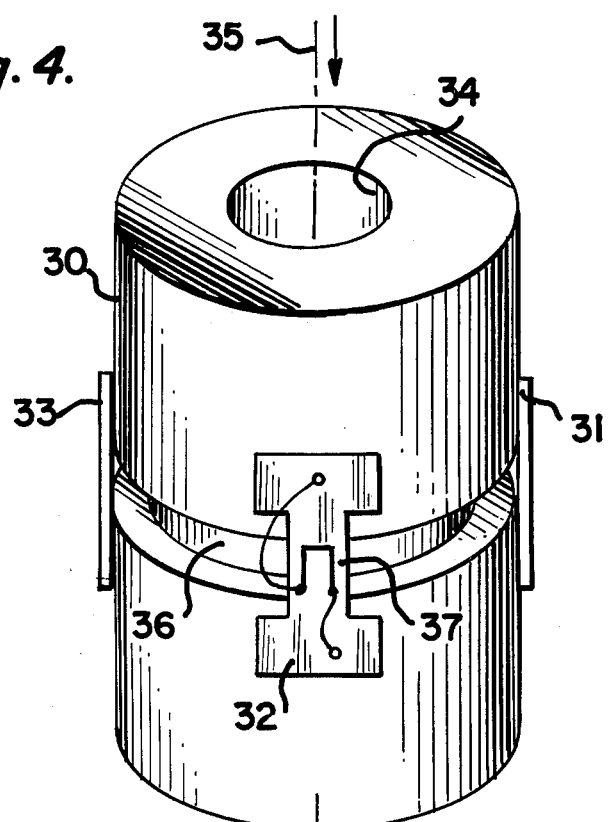
FIG. 4 is a perspective view of a load washer transducer employing a plurality of shim members.

FIG. 4 shows an alternate construction which has no peripheral flange. While the strain transfer is not so efficient as the preferred embodiment, the construction is simpler.

Thus, in FIG. 4 there is shown a cylindrical housing 30 having a central aperture 34. The cylindrical housing 30 is symmetrically disposed about the axis 35. The housing 30 has a peripheral slot 36 which is similar in nature and construction to slot 14 of FIG. 1.

As indicated above, the housing 30 does not contain peripheral flanges and hence, the strain transfer would not be as efficient in this particular type of construction, but as can be readily ascertained, the housing 30 is simpler to construct.

Shown located across the slot 36 of the housing 30 are thin metallic shims 31, 32 and 33. Not shown is another metallic shim which would be located opposite shim 32 and across the slot. This shim would, of course, be positioned with its center line perpendicular to the diameter extending through the center line of shim 32.

Figure 7:
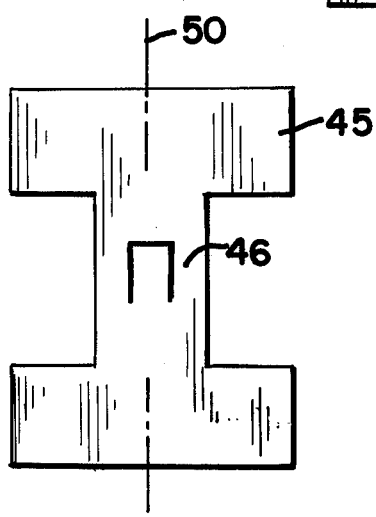
FIG. 7 is a plan view of a shim member having a sensor thereon arranged relatively parallel to the cylindrical axis.

As shown, shim 32 has positioned thereon a sensor 37 having its axis parallel to the main axis 35 of the housing 30. The diametrically opposite shim also has a sensor positioned thereon in the same orientation as sensor 37. The exact nature of the shim configuration for both shim 37 and the shim not shown is depicted in FIG. 7. Hence, the shim diametrically opposite shim 32 is an "I" shaped configuration as 45 and has located thereon a sensor 46 oriented with its main axis parallel to the center axis 50 of the "I" shaped shim, which axis is relatively parallel to the axis 35 of the housing 30.

Figure 6:
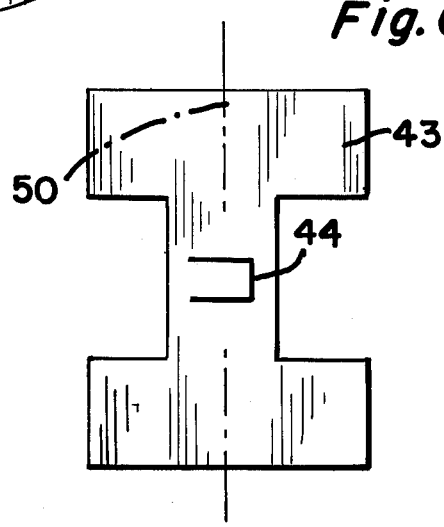
FIG. 6 is a plan view of a shim member showing a transducer arrangement relatively perpendicular to the main axis of the cylinder.

Shims 31 and 32 are also diametrically positioned across the slot 36 and would contain associated sensors oriented as that shown in FIG. 6. Thus, the sensor 44 associated with the shim 43 in FIG. 6 has its main axis perpendicular or transverse to axis 50 and hence, axis 35. In this manner, sensors as 37 respond to the parallel stress across the slot 36, while sensors as 44 respond to the transverse stress.

The four sensors thus described in FIG. 4 associated with the four shims can be wired by employing suitable lead arrangements in a Wheatstone bridge configuration. Thus, the resultant bridge configuration would have two resistive arms, each including at least one sensor responsive to parallel stress across the slot and two additional arms, each consisting of at least one sensor responsive to transverse stress across the slot.

It is noted that the configuration depicted in FIG. 4, while not containing the peripheral flanges, includes four shim elements welded across the slot and hence, by the use of the two additional shim members provides a relatively stiff structure, while still allowing adequate strain levels to be transmitted to associated sensors or sensing elements.

I claim:

1. A load cell transducer, comprising:
a longitudinal cylindrical member disposed about a given axis and having a top and a bottom surface, each surface including a central aperture extending between said surfaces, a main surface of said member extending between said top and bottom surfaces and having a narrow peripheral slot as compared to the length of said member between said top and bottom surfaces, said slot located about said axis and relatively coaxial with said aperture, and at least one sensor secured to said main surface and positioned to bridge said slot to provide an output proportional to the magnitude of a load applied to one of said top and bottom surfaces, said at least one sensor disposed relatively parallel to said axis and positioned mainly within the area of said slot.

2. The load cell transducer according to claim 1 further comprising a second sensor secured to said main surface and diametrically opposite said at least one sensor and oriented relatively parallel to said axis.

3. A load transducer, comprising:
a housing of a generally cylindrical configuration, said housing having a top and bottom surface, at least one of said surfaces having a projecting peripheral flange, said top and bottom surfaces including a central aperture aligned relatively coaxially with said flange and extending between said top and bottom surfaces, a major surface of said cylindrical member extending between said top and bottom surfaces and further having a narrow peripheral slot as compared to the length between said top and bottom surfaces, said slot located between said top and bottom surfaces and coaxial with said aperture, and at least one sensor secured to said housing on said major surface and positioned to bridge said slot, to cause said sensor to provide an output proportional to the magnitude of a load applied to either said top or bottom surfaces.

4. A load cell transducer, comprising:
a cylindrical housing symmetrically disposed about an axis having a top and bottom surface with a central aperture extending between said surfaces and disposed about said axis, one of said surfaces having a peripheral projecting flange relatively coaxial with said central aperture, a major surface of said cylindrical housing extending between said top and bottom surfaces and having a narrow peripheral slot as compared to the length of said housing between said top and bottom surfaces, said slot coaxial with said aperture, said sensing means coupled to said housing and positioned to bridge said slot to cause said sensing means to provide an output proportional to the magnitude of a load applied to said flanged surface.

5. The load cell transducer according to claim 4 wherein said cylindrical housing is fabricated from a metal.

6. The load cell transducer according to claim 4 further including a projecting peripheral flange relatively congruent with said first flange and located on said other surface, whereby both said top and bottom surface include a flange.

7. The load cell transducer according to claim 4 wherein said sensing means includes a thin metallic shim coupled to said housing and positioned across said slot with the center line of said shim relatively parallel to said axis, and at least one sensor element mounted on said shim in the area of said slot.

8. A load cell transducer, comprising:
a longitudinal cylindrical member disposed about a given axis and having a top and bottom surface, each surface including a continuous central aperture extending between surfaces and aligned with said axis, said top and bottom surfaces each having a peripheral flange coaxial with said central aperture to provide a force receiving area, a main surface of said member extending between said top and bottom surfaces and having a peripheral slot coaxial with said aperture and positioned relatively parallel to said top and bottom surfaces, and at least one thin metallic shim coupled to said housing and bridging said slot, and at least one sensor element mounted on said shim and mainly located within said area of said shim overlaying said slot to cause said sensor element to provide an output proportional to the magnitude of a force applied to one of said flanges.

9. The load cell transducer according to claim 8 wherein said sensor element is a piezoresistive element.

10. The load cell transducer according to claim 8 wherein said housing is fabricated from a first metal and said shim is fabricated from a metal having a higher temperature expansion coefficient than said first metal.

11. The load cell transducer according to claim 9 wherein said piezoresistive element is mounted on said shim by means of a glass bond.

12. The load cell transducer according to claim 11 wherein said shim is a thin planar member of an "I" configuration, with the arms of said "I" coupled to said housing and said central portion positioned across said slot, with said piezoresistive element mounted on said central portion.

13. A load cell transducer, comprising:
a cylindrical housing symmetrically disposed about an axis having a top and bottom surface with a central aperture between said surfaces and disposed about said axis, a major surface of said housing extending between said top and bottom surfaces and having a narrow peripheral slot as compared to the length of said member between said top and bottom surfaces, said slot coaxial with said aperture, and at least one thin metallic shim coupled to said housing and positioned across said slot and at least one element mounted on said shim and positioned above said slot with the axis of said sensor element relatively parallel to said housing axis with said shim member acting as a spring member to maintain the symmetry of said housing.

14. The load cell transducer according to claim 13 further comprising a second sensor element positioned on said shim and located above said slot with the axis of said second sensor relatively transverse to said axis of said first sensor.

15. The load cell transducer according to claim 13 further including a second thin metallic shim coupled to said housing on a surface opposite to said at least one shim and positioned transverse to and along a common diameter, said second shim having at least one second sensor element mounted thereon and above said slot with the axis of said sensor element relatively parallel to the axis of said other sensor element.

16. The load cell transducer according to claim 15 wherein said second shim further has mounted thereon another sensor element positioned on said shim and above said slot with the axis of said another sensor element relatively peripendicular to the axis of said one second sensor element.

17. The load cell transducer according to claim 13 further comprising: second, third and fourth metallic shims, said second shim coupled on said housing diametrically opposite said at least one shim and positioned across said slot, said second shim having located thereon and positioned above said slot, a second sensor with the axis parallel to said housing axis, said third shim coupled to said housing between said one shim and said second shim and positioned across said slot, with a third sensor located on said shim and having its axis relatively transverse to said housing axis, and said fourth shim diametrically opposite said third shim and coupled to said housing to bridge said slot with a fourth sensor located thereon with its axis relatively transverse to said housing axis, whereby said first and second sensors are responsive to stress in a direction parallel to said housing axis and said third and fourth sensors are responsive to stress in a direction relatively transverse to said housing axis.

18. The load cell transducer according to claim 17 wherein said sensors are connected in a Wheatstone bridge configuration.

19. The load cell transducer according to claim 17 wherein said sensors associated with said shims are piezoresistive elements.

20. The load cell transducer according to claim 13 wherein at least one of said top and bottom surfaces contain a peripheral flange relatively coaxial with said central aperture.

* * * * *